United States Patent [19]
Mercier

[11] 3,794,078
[45] Feb. 26, 1974

[54] PRESSURE VESSEL
[76] Inventor: Jacques H. Mercier, 49 Rue de Naples, Paris, France
[22] Filed: Mar. 15, 1972
[21] Appl. No.: 234,760

[52] U.S. Cl. .............................................. 138/30
[51] Int. Cl. ........................................... F16l 55/00
[58] Field of Search ..................... 222/386.5; 138/30

[56] References Cited
UNITED STATES PATENTS

| 3,433,268 | 3/1969 | Greer | 138/30 |
| 2,387,598 | 10/1945 | Mercier | 222/386.5 |
| 3,593,747 | 7/1971 | Mercier | 138/30 |
| 3,319,420 | 5/1967 | Mercier | 222/386.5 X |
| 2,874,721 | 2/1959 | Mercier | 138/30 |

Primary Examiner—Stanley H. Tollberg
Assistant Examiner—Francis J. Bartuska
Attorney, Agent, or Firm—Arthur B. Colvin

[57] ABSTRACT

This invention relates to a pressure vessel and more particularly to a pressure accumulator of the type having a rigid container having a port at one end for flow of fluid therethrough. A deformable partition in the form of a bladder is positioned in the container and is charged with gas under pressure. The closed end of the bladder has an axially mounted button or valve member which will move against the periphery of the container port to close the latter when the bladder is inflated. The button and the periphery of the port define two elements of a valve, at least one of which has a resilient surface preferably of rubber to reduce the impact when the two elements are brought into engagement for closure of the valve.

4 Claims, 3 Drawing Figures

PRESSURE VESSEL

As conducive to an understanding of the invention, it is noted that conventional pressure accumulators may comprise a rigid container having a pair of ports therein for flow of fluid therethrough, one of which serves as the gas charging port for a deformable bladder positioned in the container and the other of which serves as the fluid port. The bladder has a valve member secured to the free end thereof, said valve member when the bladder expands in operation of the accumulator, moving with relatively great rapidity and force against a valve seat defined by the fluid port. As a result of such impact, cracking and breaking of the valve member often occurs with resultant failure of the accumulator.

It is accordingly among the objects of the invention to provide a pressure accumulator of the above type which has a valve assembly comprising a valve member and associated valve seat, which may readily be fabricated and installed and which will permit closing of the valve assembly with a minimum of impact thereby enhancing the life of the accumulator.

According to the invention these objects are accomplished by the arrangement and combination of elements hereinafter described and more particularly recited in the claims.

In the accompanying drawings in which are shown one or more of various possible embodiments of the several features of the invention.

Figure 1:
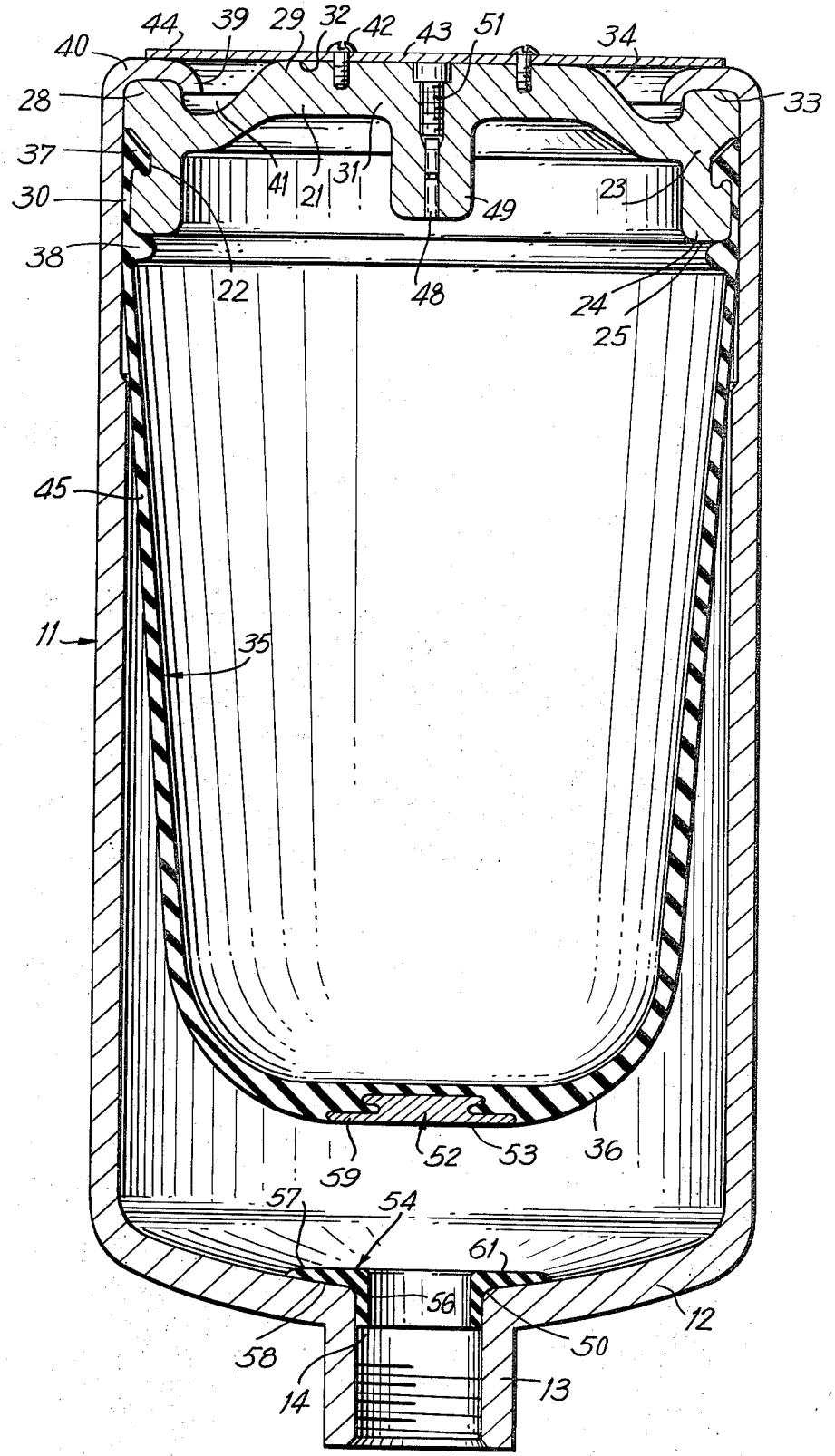
Figure 2:
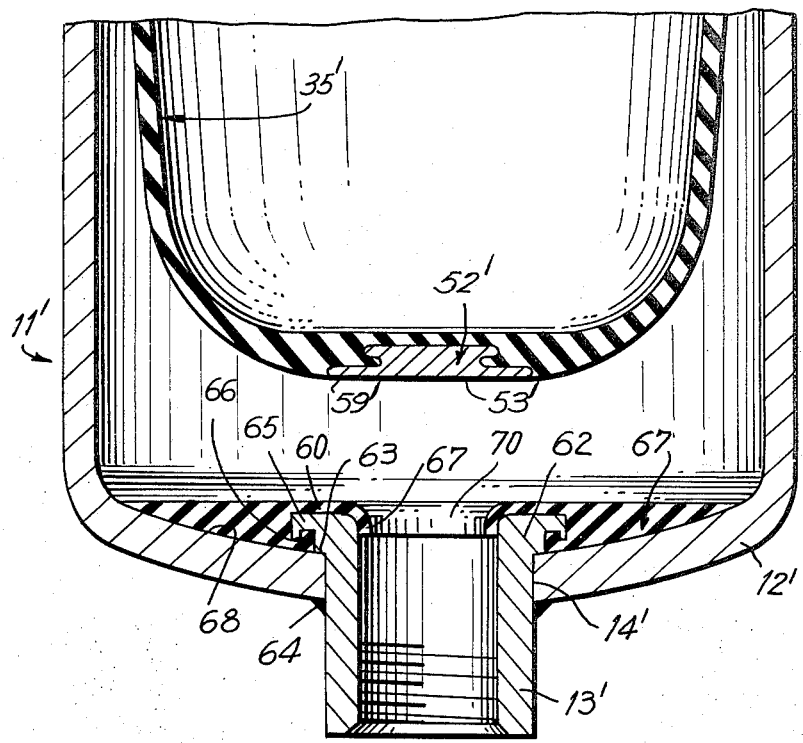
Figure 3:
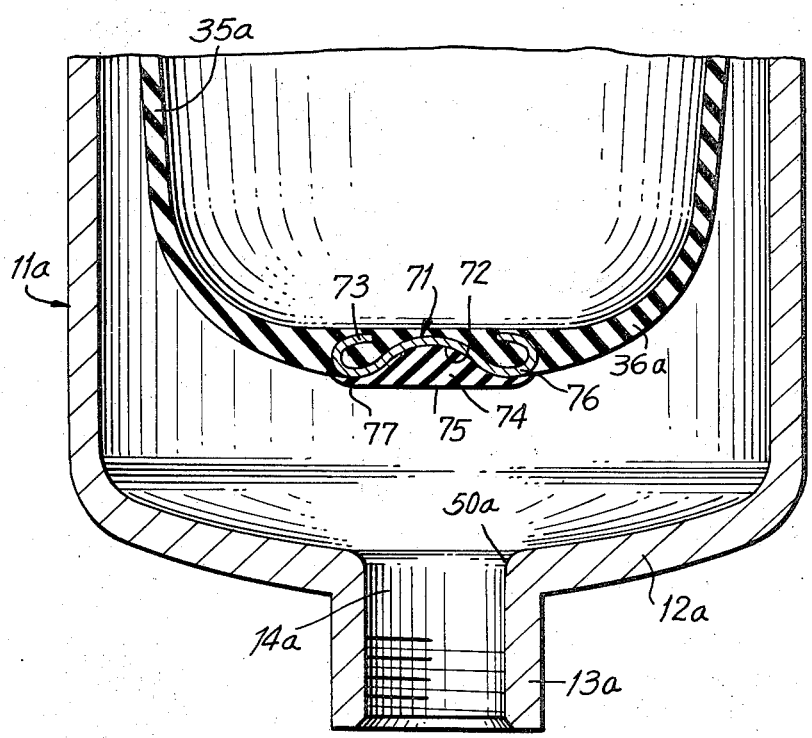

FIG. 1 is a longitudinal sectional view of a pressure accumulator according to one embodiment of the invention, and FIGS. 2 and 3 are fragmentary longitudinal sectional views of two other embodiments of the invention.

Referring now to the drawings, as shown in FIG. 1, the pressure vessel illustratively comprises a substantially cylindrical container 11 of rigid material such as steel or aluminum, capable of withstanding the pressure to which it is to be subjected in use.

The container 11 has one end closed as at 12 and an internally threaded sleeve or nipple 13 extends axially from a port or opening 14 in such closed end 12 and illustratively is formed integrally therewith.

Positioned in the mouth of the container 11 remote from the closed end 12 thereof is a substantially cup-shaped cover member 21 which has an annular groove 22 in the outer surface of the side wall 23 thereof. The portion 24 of the side wall 23 between groove 22 and the periphery or inner end 25 of said side wall 23 is of reduced diameter so that the outer surface of said side wall portion 24 will be spaced from the inner surface of the container wall when the cover member 21 is positioned therein.

The cover member 21 has a peripheral rim 28 rising from the outer surface 29 thereof. The central portion 31 of the cover member 21 presents a flat surface 32 which is in a plane extending beyond the plane of the end 33 of rim 28 and the top surface of the cover member from the root end of rim 28 to the periphery of the central portion 31 in inclined upwardly as at 34.

Positioned in the container 11 is a deformable partition illustratively in the form of an elongated bladder 35 of rubber or similar material having like characteristics. The bladder 35 is closed at one end as at 36 and the mouth of the bladder has a pair of spaced inwardly extending beads 37, 38.

The bead 37 is designed to be accommodated in the annular groove 22 and the bead 38 is designed to be positioned beneath the end 25 of the side wall 23 of the cover member.

When so mounted with the cover member positioned in the container, the bead 37 will be compressed in the annular groove 22 to form a fluid seal and the bead 38 will be retained beneath the end 25 of the side wall 23, the portion 30 of the bladder wall between the beads 37, 38 being under tension.

In order to retain the cover member 21 in the container, the periphery 40 of the mouth of the container is bent inwardly as shown so that it extends over the end 33 of the rim 28 and the inner edge 39 of the periphery 40 is bent downwardly into the annular recess 41 defined by the inclined portion 34 of the outer surface of the cover member.

Secured to the central portion 31 of the cover member 21 as by the screws 42 is a disc 43, the periphery 44 of which will rest on the periphery 40 of the mouth of the container 11 to retain the end 33 of the rim 28 against the undersurface of the periphery 40.

As is shown in FIG. 1, the bladder 35 is substantially frusto-conical in cross section with its side wall 45 being of greater diameter at the portion thereof adjacent the bead 38 than at the closed end 36 thereof. The bladder may be charged with a gas under pressure through a port 48 defined by an axial bore extending through the central portion 31 of the cover member 21 and through axial boss 49 depending from the undersurface of the cover member. The boss 49 has a suitable air valve 51 therein which is concealed by the disc 43.

In order to close the inner end 50 of port 14, the closed end 36 of the bladder has a button 52 secured thereto and axially aligned therewith. The button is preferably molded in the end 36 of the bladder so that it will be securely affixed thereto and as shown in FIG. 1, the outer surface 53 of the button is exposed with respect to the bladder end 36.

The button or valve member 52 is of material harder than that of the bladder and may be of aluminum, steel or other hard material.

According to the invention, in order to absorb the impact which would otherwise occur if the hard metal button hit directly against the periphery 50 of the opening 14 in the end 12 of the container, a washer 54 of resilient material such as rubber is provided.

As is shown in FIG. 1, the washer has a sleeve portion 56 of diameter such that it may readily fit into opening 14 and an annular flange 57 extends radially outward from the inner end of the sleeve portion 56.

More particularly, the undersurface of flange 57 rests on the periphery of inner end 50 of opening 14 and preferably is bonded thereto by a suitable cement as at 58.

With the arrangement above discussed, it is apparent that when th bladder 35 expands, the periphery 59 of the button or valve member 52, which is of diameter greater than the diameter of opening 14 will abut against the top surface 61 of flange 57. As a result, the shock or impact of closure will be minimized due to the resilience of washer 54 and the force exerted by the expanded bladder 35 will cause the button 52 to compress the flange 57 thereby effecting a dependable seal.

The embodiment of the pressure vessel shown in FIG. 2 is similar to that shown in FIG. 1 and corresponding elements have the same reference numerals primed.

As shown in FIG. 2, the axial opening in the closed end 12' of container 11' mounts an internally threaded sleeve or nipple 13'. The inner end 62 of the sleeve 13' is of enlarged diameter defining an annular shoulder 63 which abuts against the periphery of opening 14' to limit the outward movement of the sleeve which is secured in position as by welding at 64.

An annular flange 65 is formed integrally with and extends radially outward from the inner end of the sleeve 13', the periphery of the flange 65 having a depending annular lip 66.

Secured to the inner end of sleeve 13' preferably by being bonded thereto is a washer 67 of resilient material such as rubber or similar material having like characteristics.

As shown in FIG. 2, the washer has a portion 60 which extends over the inner surface of the end 62 and then curves into the bore 80 of sleeve 13' as at 67. The bottom surface 68 of the washer has a curvature complementary to the inner surface of the end 12' so that it will fit snugly thereagainst.

The button or valve member 52' is secured to the bladder 35' in a manner similar to that of the embodiment of FIG. 1.

As the operation of the valve member 52' shown in FIG. 2 is similar to the operation of the valve member 52 of FIG. 1 it will not be described.

The embodiment of the pressure vessel shown in FIG. 3 is also similar to that shown in FIG. 1 and corresponding elements have the same reference numbers with a letter associated therewith.

Thus, the closed end 12a of the container 11a has an internally threaded sleeve or nippel 13a extending axially from a port or opening 14a in such closed end and illustratively is formed integrally therewith.

In order to close the inner end 50a of port 14a, the closed end 36a of the bladder 35a has a cup-shaped button 71 secured thereto and axially aligned therewith. The button has a concave depression 72 in the floor thereof, and the free ends 73 of the side walls of the cup-shaped button 71 are curved inwardly as shown. The button is molded integrally in the end 36a so that it will be securely affixed thereto.

A plug 74 is positioned in the concave depression 73 either by suitable adhesive or by being bonded therein. The plug 74 is of thickness such that its outer surface 75 lies in a plane that extends beyond the plane of the periphery 76 of the button 71. Furthermore, the diameter of the outer surface 75 of the button is such that its periphery 77 will extend beyond the periphery 76 of the button.

The diameter of the button 71 and plug 74 which together define a valve member, is greater than the diameter of opening 14a so that when the bladder 35a expands the periphery 77 of the plug 75 will press against the periphery of end 50a to define a metal to rubber seal.

With the embodiments above described, when the valve member abuts against the periphery of the opening or port, there will be a rubber to metal contact. As a result, the impact on contact will be reduced, thereby minimizing, if not preventing breakage of the valve member and also providing a dependable seal.

Having thus described my invention, what I claim as new and desire to secure by letters Patent of the United States is:

1. A pressure accumulator comprising a rigid container having a pair of ports with a deformable partition intervening therebetween to define two chambers, said portition comprising a bladder having one end closed and having a mouth at its other end in communication with one of said ports for charging of the chamber defined by the interior of said bladder with fluid under pressure, said bladder being mounted at its mouth end in said container so as to be axially aligned therewith and with said other port, said bladder having a valve member defining a valve element secured to its closed end and axially aligned therewith, said valve member comprising a button of rigid material integral with said bladder and having a diameter greater than that of said other port, said button having a flat peripheral portion, said other port having a tubular member coaxial therwith and extending outwardly therefrom, a separate annular valve seat coaxial with said other port and encompassing the latter, said valve seat defining a second valve element, said valve member being movable into engagement with said valve seat to close said other port upon expansion of said bladder to force the fluid charged into the other of said chambers out of said other port, said valve seat comprising a shock absorbing surface engaged by the flat peripheral portion of said button upon closure of said other port to minimize closing impact, said annular valve seat comprising a gasket of resilient material having a central opening coaxial with said other port, the inner surface of the peripheral portion of said gasket adjacent said opening defining the seat for said flat peripheral portion, said gasket being positioned against the inner surface of the end of the container through which the other port extends coaxial with the bladder.

2. The combination set forth in claim 1 in which said gasket of resilient material has a sleeve portion adapted to fit into said other port and an annular flange portion extending radially outward from the inner end of said sleeve portion and having its outer surface seated on the wall surface of the container through which said other port extends, the inner surface of said flange defining the valve seat.

3. The combination set forth in claim 2 in which the outer surface of said flange is secured to the wall surface of the container.

4. The combination set forth in claim 1 in which said container has an end wall through which said other port extends, a sleeve is positioned in said other port, said sleeve having an enlarged diameter portion at its inner end defining an annular shoulder resting on the periphery of said other port, means securely to retain said sleeve in said other port, said inner end of said sleeve having an annular flange extending radially outward therefrom, said shock absorbing gasket of resilient material having its central opening coaxial with said sleeve, the periphery of said opening being bonded to said flange with an annular portion of said gasket material extending over the inner end of said sleeve to define said valve seat.

* * * * *